United States Patent
Pfaeffle

[19]

[11] Patent Number: 5,931,559
[45] Date of Patent: Aug. 3, 1999

[54] SPORTS HEADGEAR WITH FIBER OPTIC LIGHTING AND STROBE LIGHT

[76] Inventor: Patricia Pfaeffle, 72 S. Charles St., Hopelawn, N.J. 08861

[21] Appl. No.: 08/852,822

[22] Filed: May 7, 1997

[51] Int. Cl.[6] .................................................. F21L 11/00
[52] U.S. Cl. ............................................ 362/106; 362/570
[58] Field of Search ............................ 362/31, 103, 105, 362/106, 32, 570

[56] References Cited

U.S. PATENT DOCUMENTS

| | | | |
|---|---|---|---|
| 4,186,429 | 1/1980 | Johnston | 362/106 |
| 5,111,366 | 5/1992 | Rife et al. | 362/106 |
| 5,128,844 | 7/1992 | Landais | 362/106 |
| 5,147,129 | 9/1992 | Ku | 362/106 |
| 5,327,587 | 7/1994 | Hurwitz | 362/105 |
| 5,404,593 | 4/1995 | Kronenberger | 362/106 |
| 5,426,792 | 6/1995 | Murasko | 362/105 |
| 5,559,680 | 9/1996 | Tabanera | 362/106 |
| 5,570,946 | 11/1996 | Chien | 362/106 |
| 5,588,736 | 12/1996 | Shea, Sr. | 362/106 |
| 5,608,919 | 3/1997 | Case | 362/106 |
| 5,743,621 | 4/1998 | Mantha et al. | 362/105 |
| 5,758,947 | 6/1998 | Glatt | 362/106 |

*Primary Examiner*—Laura K. Tso
*Attorney, Agent, or Firm*—Ezra Sutton

[57] ABSTRACT

Headgear having fiber optic lighting for illumination of the headgear to be worn on a person's head. The headgear includes a fiber optic lighting assembly having a light source and a plurality of fiber optic lines for transmitting light from the light source. The headgear includes an exterior surface wall having one or more grooves formed therein for holding the fiber optic lines therein. The headgear includes an interior surface wall having a first compartment for a receiving power source in the form of a battery pack and a second compartment for receiving the light source. An electrical conduit is used for connecting the battery pack to the light source. The headgear also includes an interior padding for covering the interior surface wall so as to protect the wearer's head from injury; and a closure strap having a tightening component mounted on the headgear for holding the headgear on the wearer's head. In addition, the headgear also includes a strobe light assembly for further illumination of light by the headgear.

30 Claims, 12 Drawing Sheets

SPORTS HEADGEAR WITH FIBER OPTIC LIGHTING AND STROBE LIGHT

FIELD OF THE INVENTION

This invention relates to a lightweight and durable sports headgear having fiber optic lighting on the exterior surface of the headgear for athletes participating in skate boarding, biking, in-line roller blading, roller skating, ice skating, running, jogging, skiing, snow-boarding, sky-diving, and the like. More particularly, the fiber optic lighting assembly of the sports headgear is linked to a power pack such that the fiber optic lighting provides safety and aesthetic lighting qualities to the athlete while in use.

BACKGROUND OF THE INVENTION

Most sporting activities in the United States now use sports headgear and helmets as required by law to be worn by the participants. These sporting activities take place in day light, evening and nighttime hours where children, teens and adults of both sexes have time to participate in them. Presently, most sporting activities have a venue for evening and nighttime participation for the convenience of the sport participant. Athletes participating in skate boarding, biking, in-line roller blading, roller skating, power walking, running, jogging, skiing, ice skating, snow-boarding, sky diving and the like presently use reflective clothes, or have reflective strips, and/or patches attached to their clothes and/or headgear for providing illumination to other sport participants or pedestrians or traffic when engaged in a sport activity at dusk, evening, twilight or nighttime hours.

Reflective strips/patches on the sporting equipment (i.e. skis, skate-board, skates, etc.), reflective sports headgear, and reflective clothing used by sport participants are dependent on overhead lighting from street lights, or course-way lights, or field lights, or traffic headlights from moving motor vehicles or from flashlights from other participants for sufficient illumination to be seen. When the aforementioned lights are not present or are intermittent at best, the reflective patches/strips on the athletic gear, headgear or clothing worn by the participant are not effective for providing illumination to other sport participants, non-participants (just watching the activity), moving motor vehicles, or pedestrians so as to be seen when participating in their sports activity. Also, these athletes do not necessarily have reflective athletic gear, reflective clothing or reflective helmets; the motorists do not necessarily turn-on headlights of their vehicles until nighttime hours; and street lights, pathway lights, parking area lights, course-way lights or field lights may be on a timer that turns on at a specific time, well past darkness or nighttime. All of the aforementioned conditions may lead to the participant incurring an injury or even death because another sports participant, pedestrian, or motor vehicle driver could not see the participant at dusk, evening or nighttime hours.

There remains a need for sports headgear having fiber optic lighting that provides safety and aesthetic lighting to the headgear which provides the wearer with sufficient and bright illumination so other sport participants, pedestrians, non-participants (fans) and motorists may easily see the participant. In addition, the sports headgear should be lightweight, made of durable plastic and have a battery power pack with an ON/OFF switch to provide an energy supply to the fiber optic lighting assembly.

Accordingly, it is an object of the present invention to provide a light-weight, durable, sports headgear having a fiber optic lighting assembly which provides safety and aesthetic lighting qualities to headgear for athletes participating in a given sporting activity, to be worn by adults and children of both sexes.

Another object of the present invention is to provide a sports headgear having fiber optic lighting for athletes participating in such sporting activities as skate boarding, biking, in-line roller blading, ice skating, roller skating, running, jogging, skiing, snow-boarding, sky-diving, and the like.

Another object of the present invention is to provide a sports headgear having fiber optic lighting of high intensity which gives the user's headgear sufficient illumination for other sport participants, pedestrians, and motorists to view and see the illuminated headgear when in operational use and being visible at long distances.

Another object of the present invention is to provide sports headgear having a fiber optic lighting assembly that is durable in use, low in maintenance, and long-lasting for increased lighting and service life of the fiber optic lighting assembly when in operational use.

A further object of the present invention is to provide a sports headgear having fiber optic lighting that can be mass produced in an automated and economical manner and is readily affordable by the user.

DESCRIPTION OF THE PRIOR ART

Helmets, headgear and head mounted apparatus having a fiber optic lighting system have been disclosed in the prior art. For example, U.S. Pat. No. 4,797,736 discloses a head mounted apparatus for illuminating a work site and for transmitting a visual image of the work site to a remote location for viewing on a television screen. The illumination system for this head mounted apparatus includes a light, a lens, a holding ring, and a fiber optic cable for producing a light beam. This prior art patent does not disclose the particular structure and design of the sports headgear of the present invention.

U.S. Pat. No. 5,588,736 discloses a self-lighted safety helmet having a helmet body with a phosphorescent outershell member and embedded fiber optic pieces which distribute light both axially and radially throughout the phosphorescent outershell member; and at least one fiber optic strand placed between the helmet body (padding) and the outer shell for distributing light both axially and radially throughout the phosphorescent outershell member. This prior art patent does not disclose the particular structure, configuration and design of the sports headgear of the present invention.

None of the prior art patents for sports helmets and headgear disclose the particular configuration and arrangement of the fiber optic lighting for illumination as shown in the sports headgear of the present invention.

SUMMARY OF THE INVENTION

In accordance with the present invention there is provided headgear having fiber optic lighting for illumination of the headgear to be worn on a person's head. The headgear includes a fiber optic lighting assembly having a light source and a plurality of fiber optic lines for transmitting light from the light source. The headgear includes an exterior surface wall having one or more grooves formed therein for holding the fiber optic lines therein. The headgear includes an interior surface wall having a first compartment for receiving a power source in the form of a battery pack and a second compartment for receiving the light source. An electrical conduit is used for connecting the battery pack to the light source. The headgear also includes an interior padding for covering the interior surface wall so as to protect the wearer's head from injury; and a closure strap having a tightening component mounted on the headgear for holding the headgear on the wearer's head. In addition, the headgear also includes a strobe light assembly for further illumination of light by the headgear.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED AND ALTERNATE EMBODIMENTS

OVERVIEW

Figure 1:
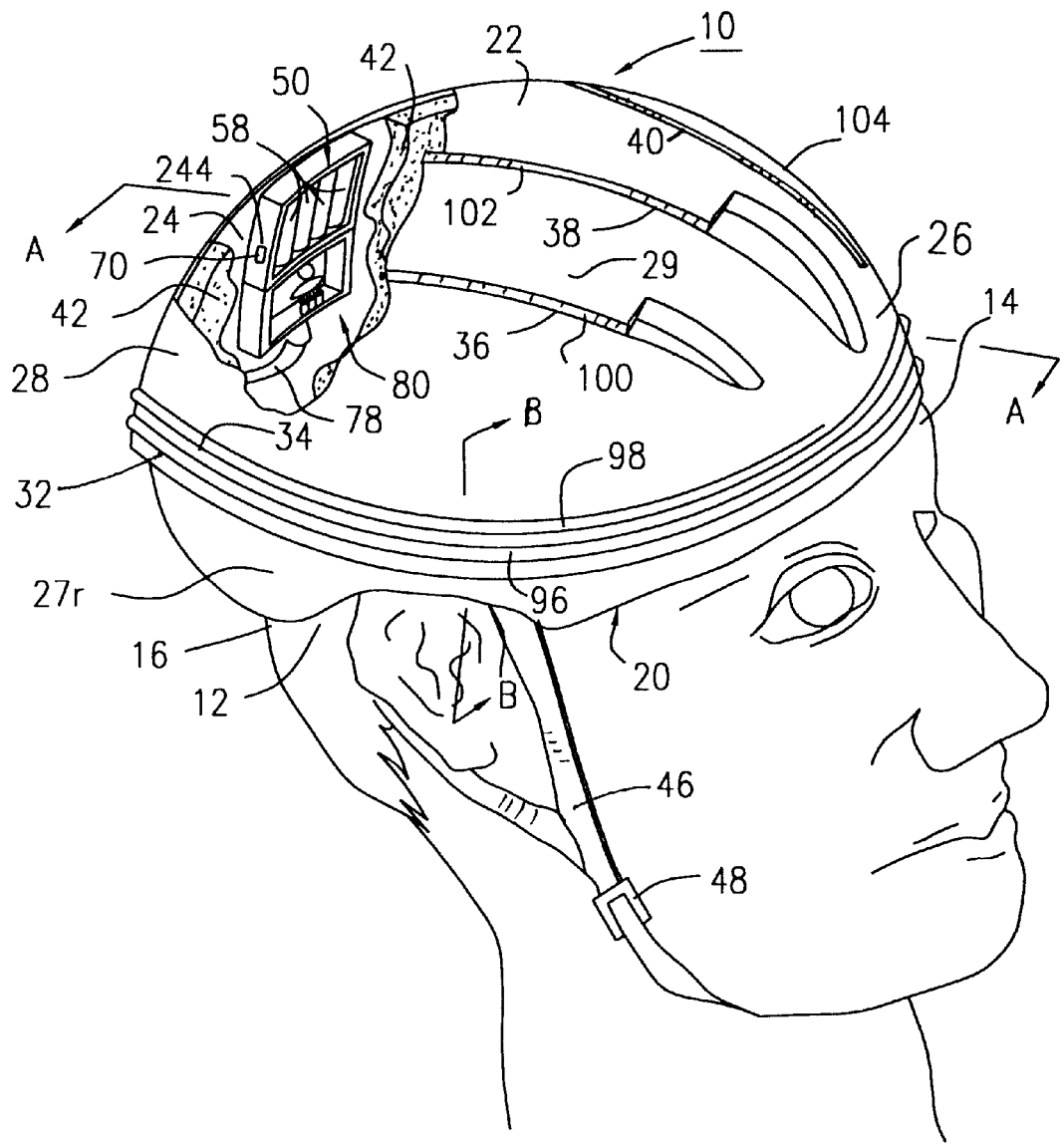
FIG. 1 is a front perspective view of the sports headgear with fiber optic lighting of the preferred embodiment of the present invention showing the major component assemblies contained therein and in operational use.

The sports headgear 10, 10', 10''', and 10''' having fiber optic lighting 80 and 80' of the preferred and alternate embodiments of the present invention are represented in detail by FIGS. 1 through 19. The sports headgear 10', 10'', and 10''' with fiber optic lighting 80 and 80' are headgear worn by athletes for providing illumination to the headgear 10', 10", and 10''', where this illumination is visible from a long distance at night. Thus, the headgear 10', 10", and 10''' having this fiber optic illumination (light) provides safety and aesthetic values to the wearer. In the preferred embodiment, the sports headgear 10 is shown to have incorporated the power source assembly 50 and the fiber optic lighting assembly 80 within a fixed interior housing 52 located at the rear end 28 of the interior surface wall 24 of headgear housing 20.

In the second embodiment, the sports headgear 10' is shown to use a retrofit modular fiber optic lighting apparatus 200 including a plastic electronic housing 210 having a first compartment 250 and a second compartment 252 for containing a power source assembly 50' and a fiber optic lighting assembly 80' respectively therein. This apparatus 200 is used for the retrofitting and attachment to a standard sports headgear/helmet 202 for illumination of that headgear 202 which then forms the retrofitted sports headgear 10'. In all other respects, the sports headgear 10' with fiber optic lighting 80', as shown in FIGS. 7 to 13 of the second alternate embodiment, functions and operates in the same manner as the sports headgear 10 with fiber optic lighting 80, as shown in FIGS. 1 to 6, of the preferred embodiment.

Figure 14:
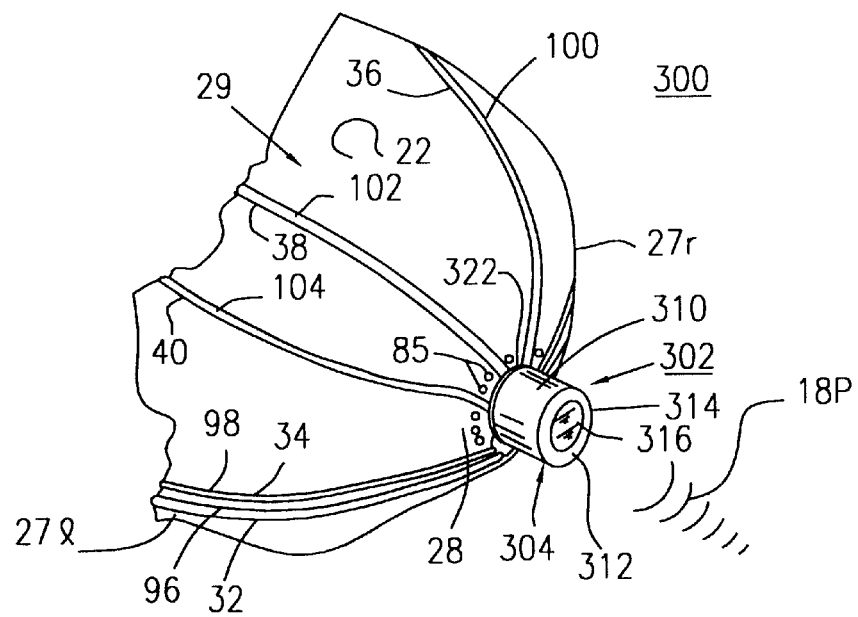
FIG. 14 is a partially cutaway perspective view of the sports headgear with fiber optic lighting of the third embodiment of the present invention showing the attached strobe light assembly located on the rear area of the exterior surface wall of headgear housing, and in operational use.
Figure 15:
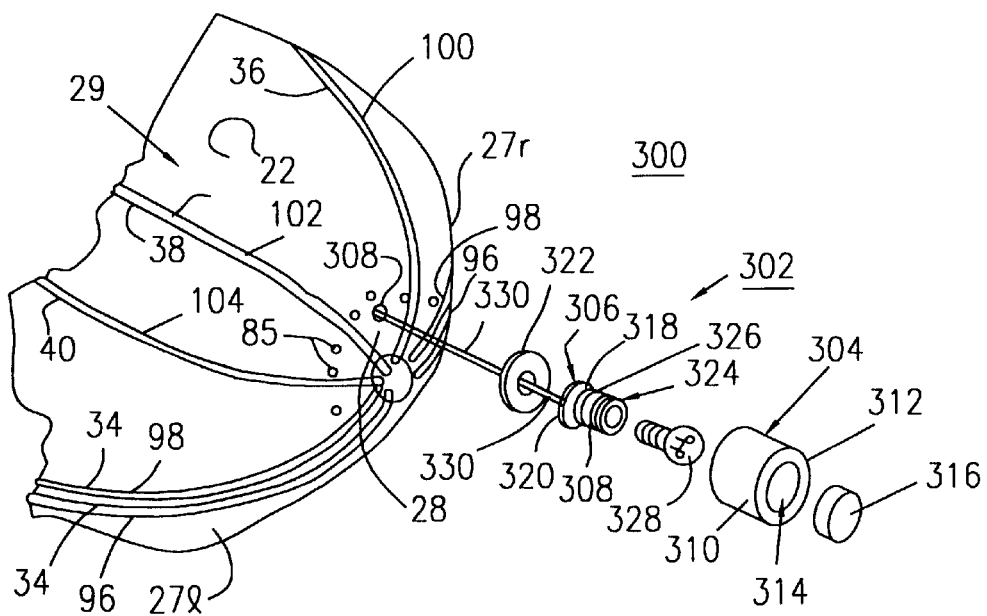
FIG. 15 is an enlarged exploded perspective view of the sports headgear with fiber optic lighting of the third embodiment of the present invention showing the strobe light assembly and its component parts contained therein.
Figure 16:
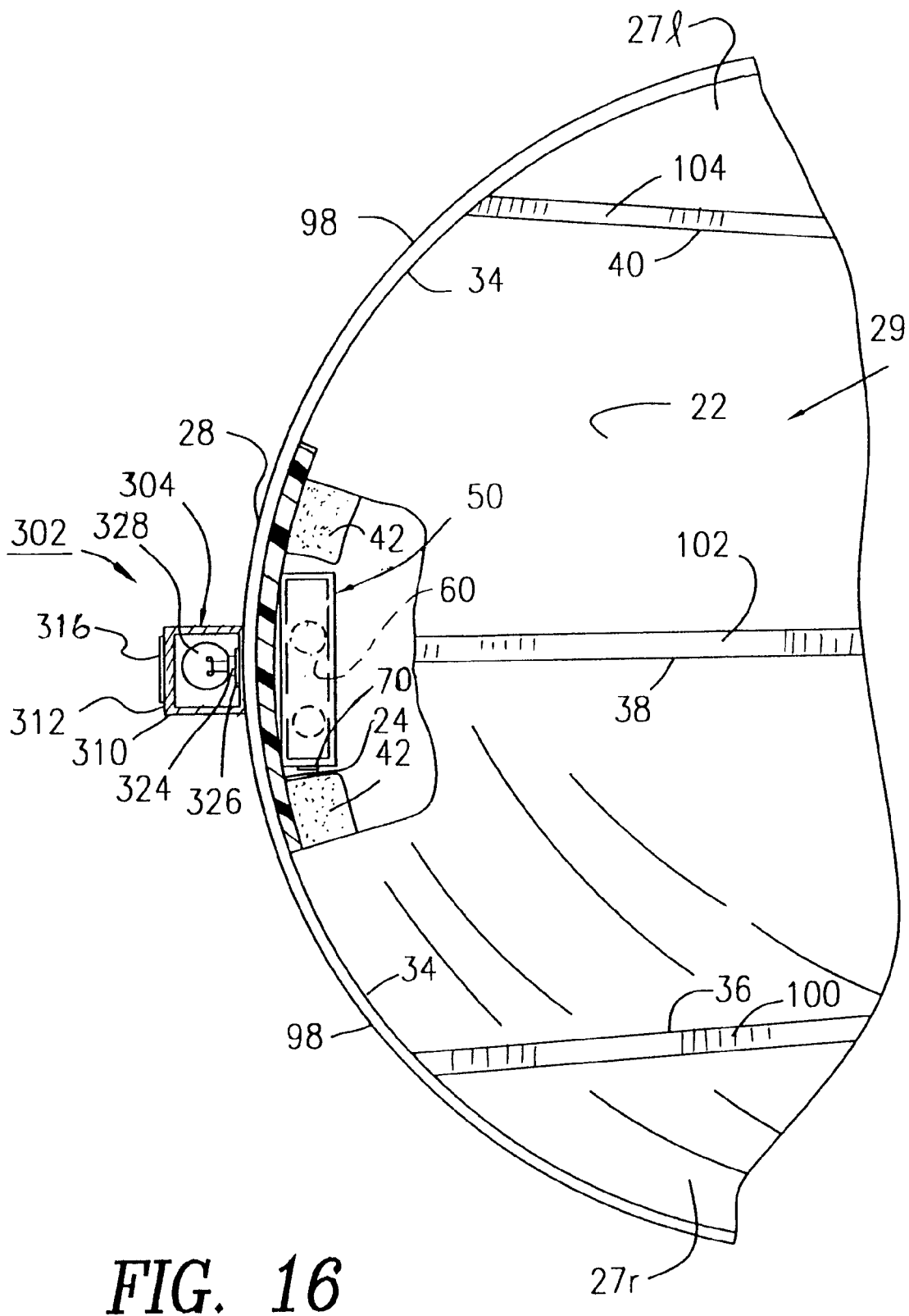
FIG. 16 is a partial cross-sectional top plan view of the sports headgear with fiber optic lighting of the third embodiment of the present invention showing the strobe light assembly, the power source assembly and fiber optic lines on the sports headgear.

The third embodiment 300 of sports headgear 10", as shown in FIGS. 14 to 16, is the same as the sports headgear 10 of the preferred embodiment, except for the addition of the strobe light assembly 302. Strobe light assembly 302 is used for further illumination of headgear 10" as the blinking strobe light 328 can be seen at great distances in darkness. In all other respects, the sports headgear 10" of the third embodiment 300 functions and operates in the same manner as the sports headgear 10 of the preferred embodiment.

Figure 17:
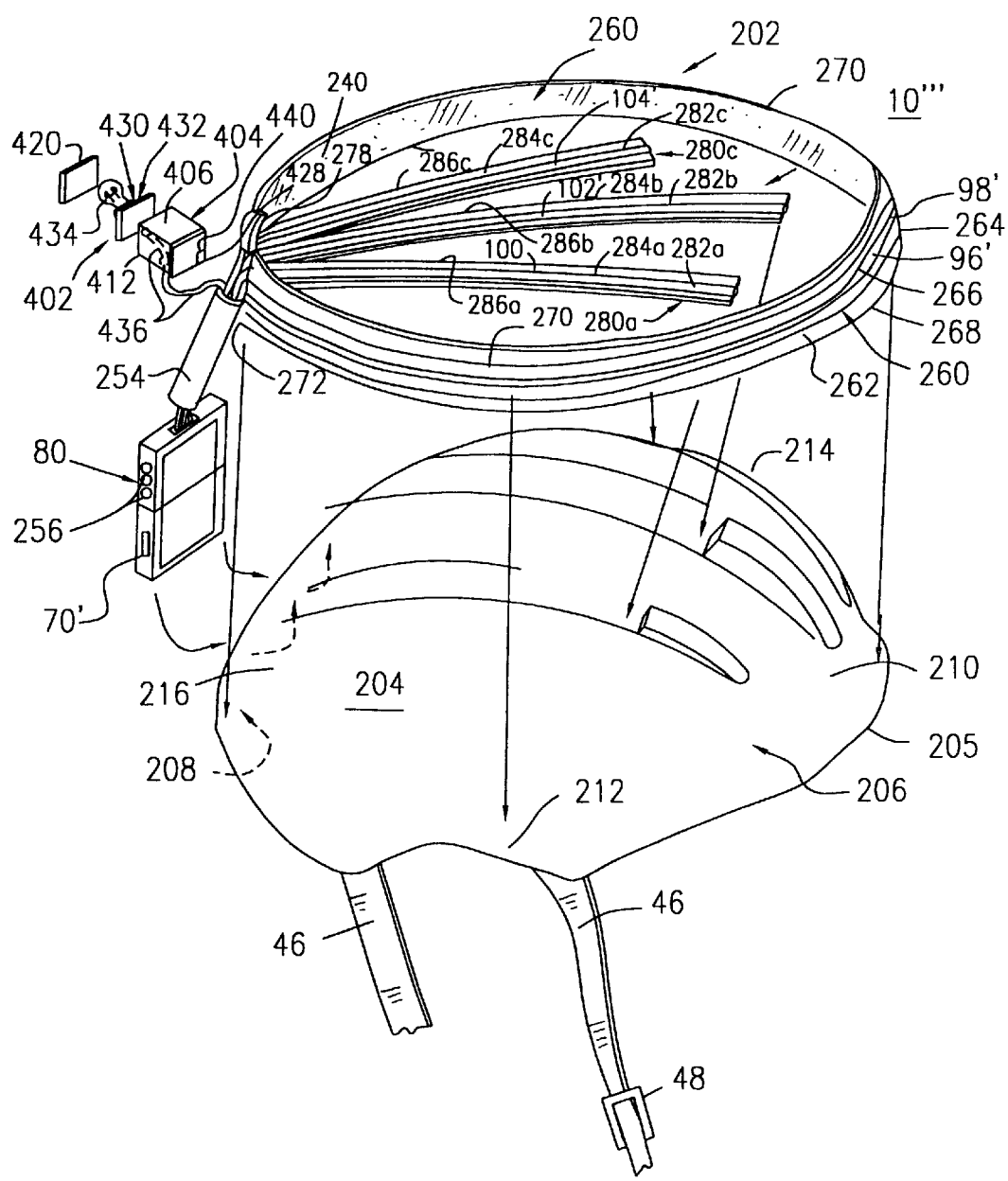
FIG. 17 is a front perspective view of the sports headgear with fiber optic lighting of the fourth embodiment of the present invention showing the strobe light assembly and the modular fiber optic retrofit apparatus for attaching to the exterior and interior surface walls of a standard sports headgear helmet.
Figure 18:
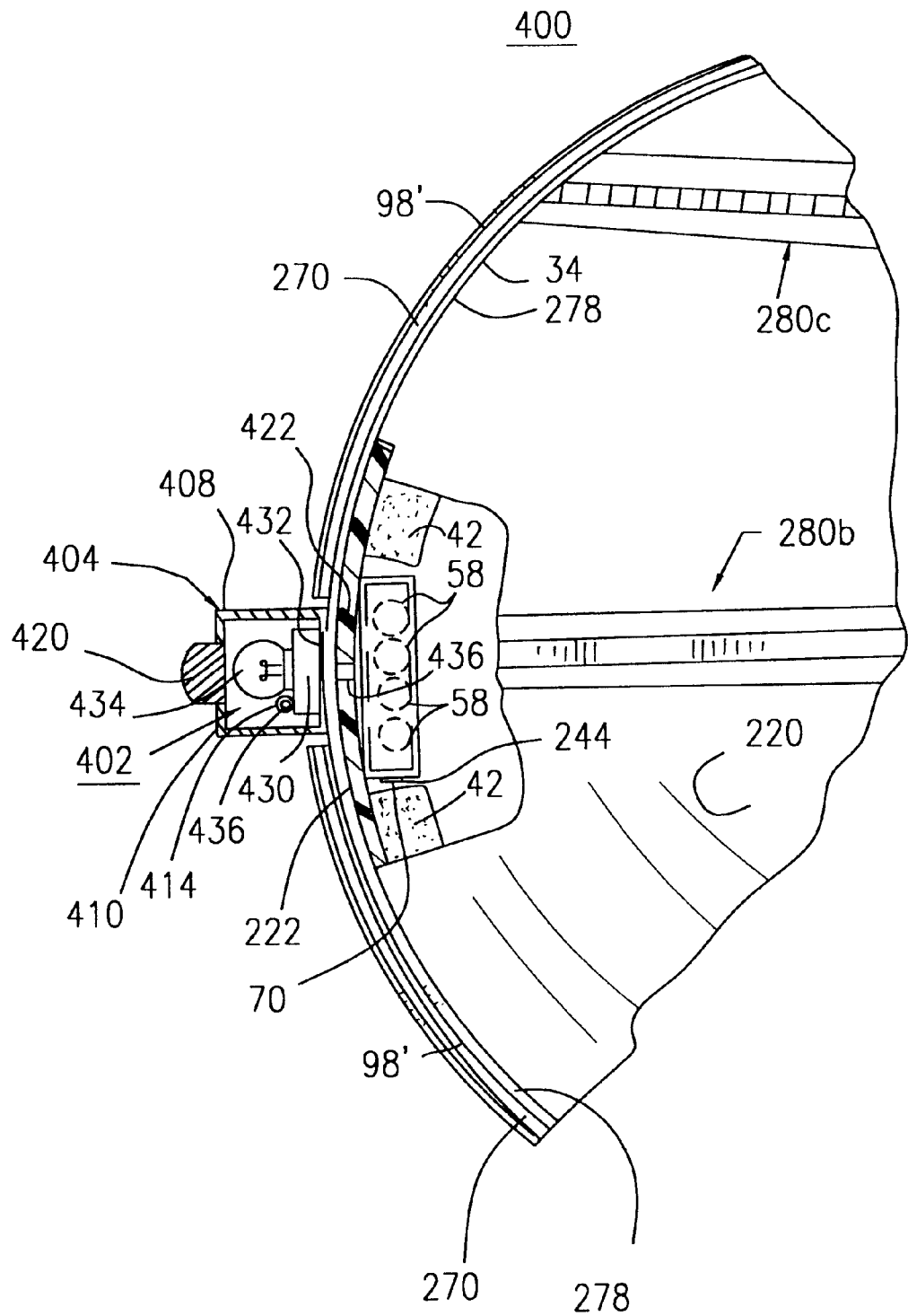
FIG. 18 is a partial cross-sectional top plan view of the sports headgear with fiber optic lighting of the fourth embodiment of the present invention showing the strobe light assembly, the power source assembly, and the first and second flexible bands having fiber optic lines therein on the sports headgear.
Figure 19:
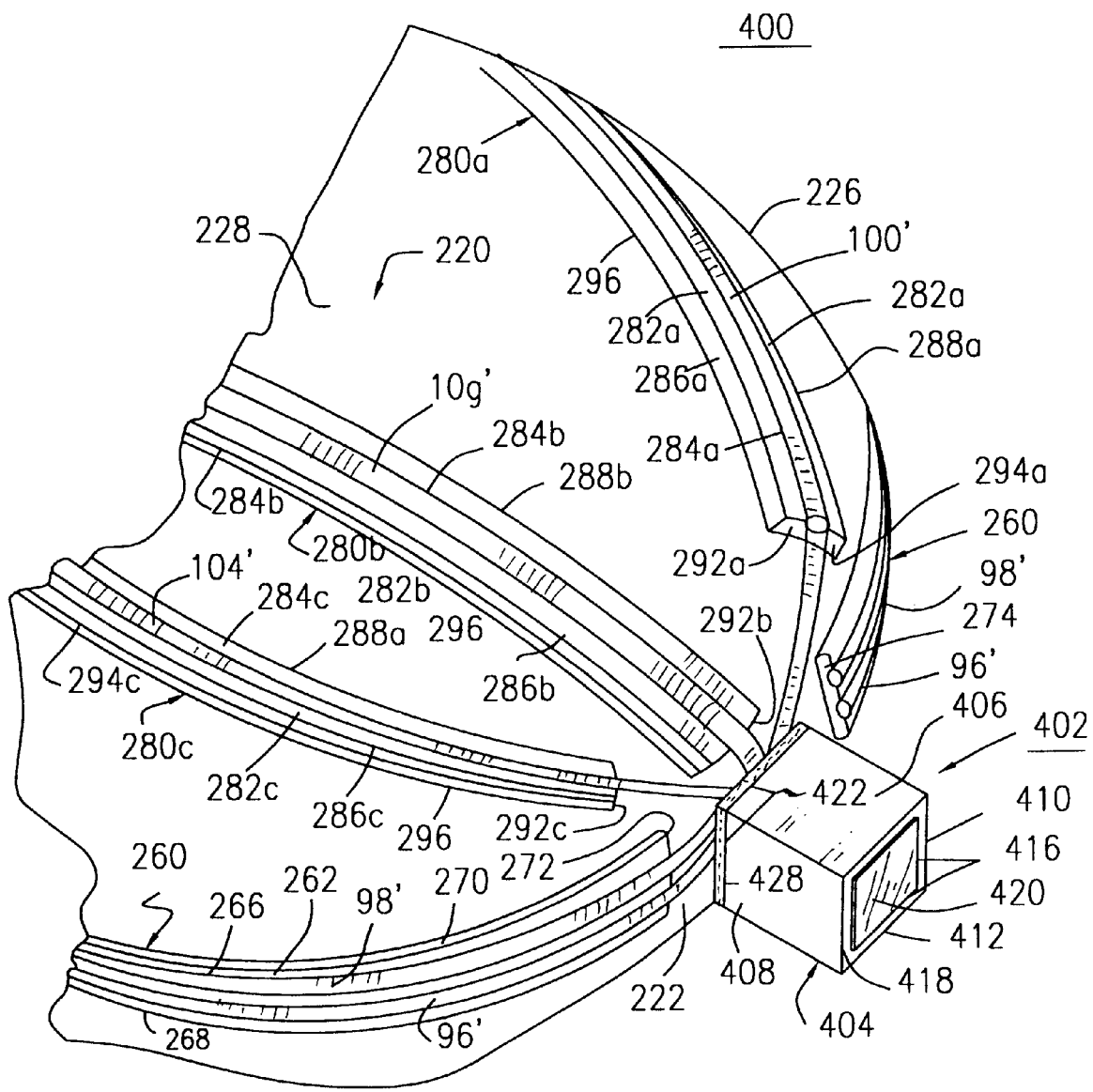
FIG. 19 is a partially cutaway perspective view of the sports headgear with fiber optic lighting of the fourth embodiment of the present invention showing the attached strobe light assembly located on the rear area of the exterior surface wall of headgear housing, and in operational use.

The fourth embodiment 400 of sports headgear 10''', as shown in FIGS. 17 to 19, is the same as the sports headgear 10" of the second embodiment 200, except for the addition of the strobe light assembly 402 to the modular fiber optic retrofit apparatus 202'. Strobe light assembly 402 is used for illumination of headgear 10''' as the blinking strobe light 434 can be seen at great distances in darkness. In all other respects, the sports headgear 10''' of the fourth embodiment 400 functions and operates in the same manner as the sports headgear 10' of the second embodiment 200.

PREFERRED EMBODIMENT 10

The sports headgear 10 with fiber optic lighting assembly 80 of the preferred embodiment of the present invention is depicted in detail by FIGS. 1 through 6 of the drawings. The sports headgear 10 includes a helmet or headgear housing 20, a power source assembly 50, a fiber optic lighting assembly 80 and a closure strap component 46.

As shown in FIGS. 1 to 6, the headgear housing 20 includes an exterior surface wall 22, an interior surface wall 24, a front end area 26, side section areas 27l and 27r, a rear end area 28, a top area 29, and a circular hole opening 30 for receiving a plurality of fiber optic lines 96, 98, 100, 102 and 104 which are received respectively within a plurality of grooves 32, 34, 36, 38 and 40 being spaced apart at various pre-determined locations on the exterior surface wall 22 of helmet housing 20.

Helmet housing 20 further includes interior head padding 42 having integrally attached plastic supports 44 for mounting the head padding 42 to the interior surface wall 24, an interior plastic housing 52 having a first internal compartment 54 and a second internal compartment 84 for containing and holding in place the power source assembly 50 and the fiber optic lighting assembly 80, respectively therein. Interior housing 52 is located and attached at the rear end 28 of interior surface wall 24 of headgear housing 20 via double-sided tape 78, glue or epoxy cement. The first interior compartment 54 is adjacent and in contact with the second interior compartment 84 having a common wall member 72 which separates the power source assembly 50 from the fiber optic lighting assembly 80. Headgear housing 20 also includes a closure strap component 46 having a tightening device 48 thereon for holding the headgear 10 on the wearer's head 12 in a proper fashion.

The power source assembly 50 within the first internal compartment 54 of housing 52 includes an accessible snap-on cover 56C or a slidable door 56D as an alternate component. Internal compartment 54 is used for holding in place a plurality of releasable batteries 58 or a single battery device 60 as an alternate component. Internal compartment 54 includes a positive plate member 62 in the form of a metal strip 62S for batteries 58 or in the form of a snap-on metal post 62P for battery 60 in the alternate component, a negative plate member 64 in the form of a metal spring 64S for batteries 58 or in the form of a second snap-on post 64P for battery 60 in the alternate component. Batteries 58 or single battery 60 supply electrical current 66 via an electrical wire line 68 to an ON/OFF button or switch 70 having a first and second mode "ON" positions 70a and 70b; and ON/OFF mode "OFF" position 70c. Also, electrical current 66 supplies power to the fiber optic lighting assembly 80 via electrical wire conduit 76. The internal compartment 54 further includes the interior common wall member 72 having a circular hole opening 74 for receiving the electrical wire conduit 76 which connects to the bulb socket 86 of the fiber optic lighting assembly 80.

Figure 2:
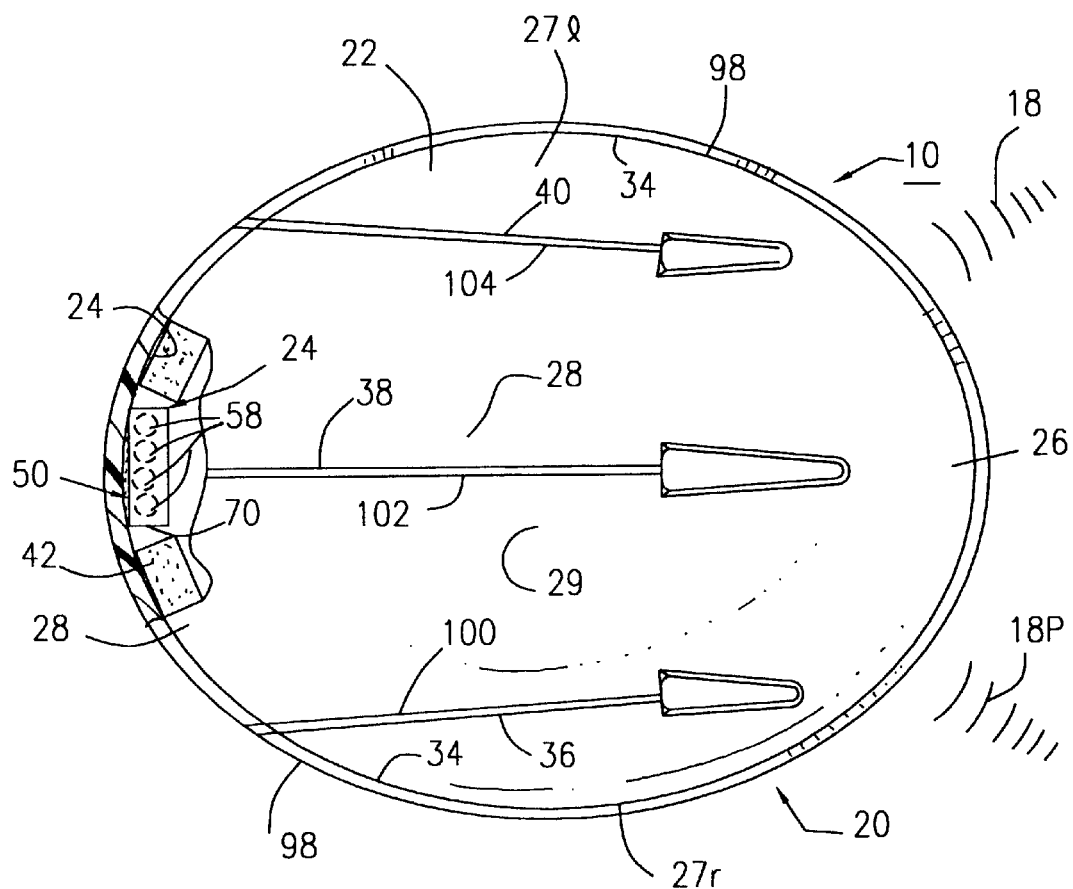
FIG. 2 is a top plan view of the sports headgear with fiber optic lighting of the present invention showing the fiber optic lines contained within grooves on the headgear's exterior surface.
Figure 3:
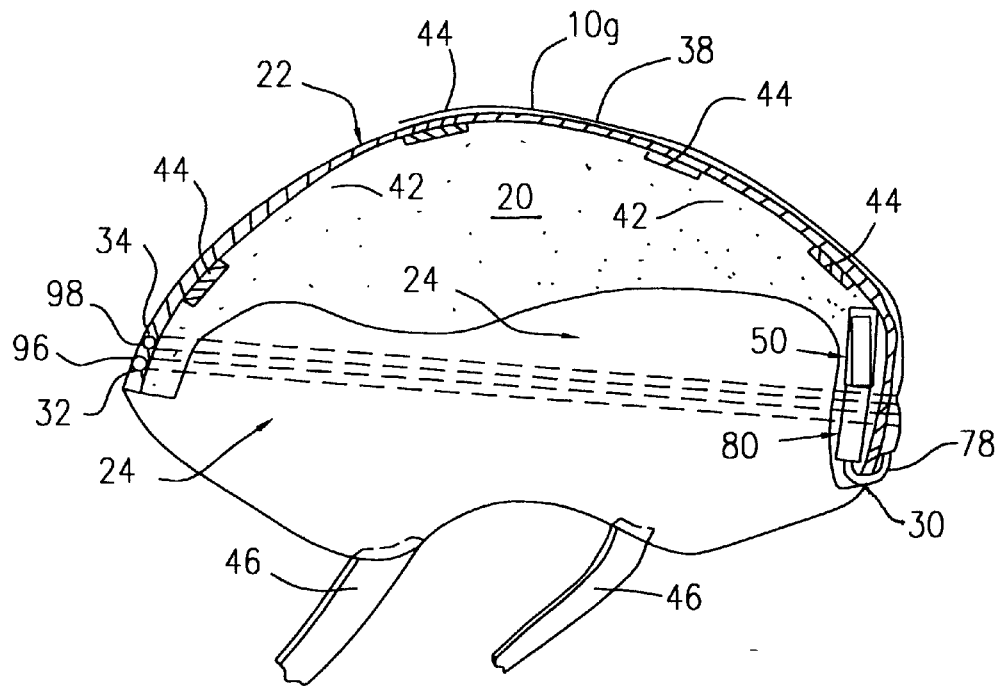
FIG. 3 is a cross-sectional view of the sports headgear with fiber optic lighting of the present invention taken along lines A—A of FIG. 1 showing all of the component parts contained therein.
Figure 4:
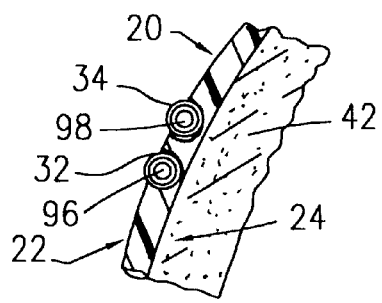
FIG. 4 is an enlarged cross-sectional view of the sports headgear with fiber optic lighting of the present invention taken along lines B–B of FIG. 1 showing the fiber optic lines being held within the grooves on the exterior surface wall or the headgear housing.

Fiber optic lighting assembly 80 within the second internal compartment 84 of housing 52 includes an accessible slidable door or snap-on cover 86. Internal compartment 84 includes an attached bulb socket 86 having a strobe component 88 and a bulb 90; a clear or colorized lens 92; and a fiber optic (strand) bundle array 94 for lighting the plurality of fiber optic lines 96, 98, 100, 102 and 104. Strobe component 88 is used for the intermittent lighting of the fiber optic lines 96 to 104. Internal compartment 84 also includes a plurality of venting openings 85 located on the interior surface wall 24 within the internal compartment 84 of fiber optic lighting assembly 80 for the venting of hot air from within the internal compartment 84, which hot air may be produced by light bulb 90. Fiber optic lines 96 and 98 of bundle array 94 are used within grooves 32 and 34, respectively, such that fiber-optic lines 96 and 98 are circumjacent (encircle) to the front, side and rear areas 26, 27l, 27r and 28 of the exterior surface wall 22 of headgear housing 20. Fiber optic lines 100 to 104 are used within grooves 36, 38 and 40, respectively, such that fiber-optic lines 100 to 104 are in the top area 29 of the exterior surface wall 22 of headgear housing 20, as depicted in FIGS. 1 and 2 of the drawings. In addition, a short section of exposed fiber optic lines 96 to 104 include a flexible sheathing component 78 for protecting the exposed fiber optic lines 96 to 104 from breaking or damage thereof.

Figure 5:
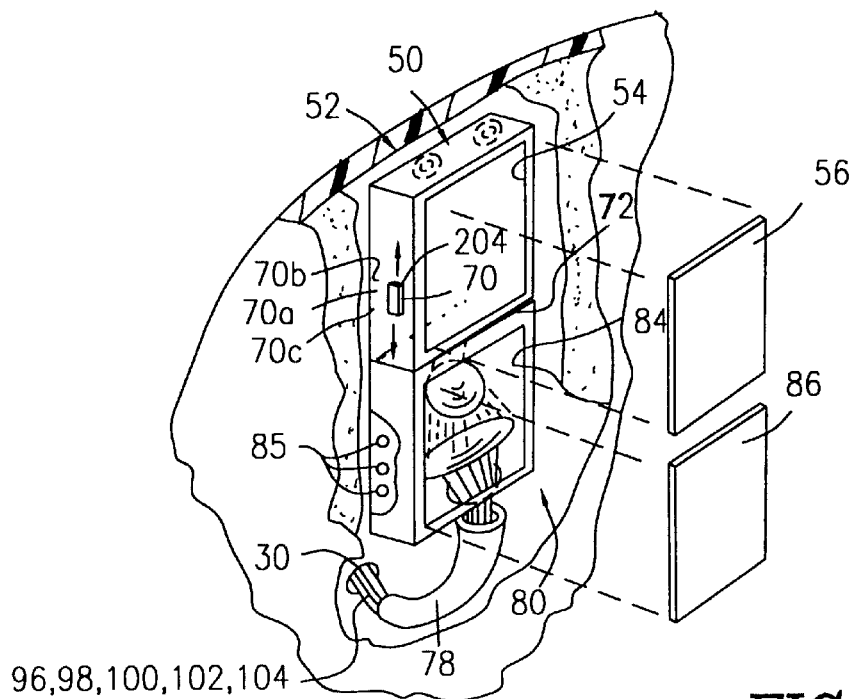
FIG. 5 is an enlarged perspective view of the sports headgear with fiber optic lighting of the present invention showing the power source assembly and the fiber optic lighting assembly and their electrical connection to each other.

As depicted in FIG. 5, the electrical schematic of the present invention shows the power source 60 being releasable batteries or a single battery device being connected by electrical line 68 to the On/Off button or switch 70. The power source 60 being connected to the bulb socket 86 via electrical wire conduit 76. Bulb socket 86 is electrically connected to a strobe component 88 and light bulb 90 having a lens 92. Lens 92 projects light rays 18 into the fiber optic bundle array 94 for the lighting of the plurality of fiber optic lines 96 to 104.

SECOND EMBODIMENT 200

Sports headgear 10' of the second embodiment 200 of the present invention is depicted in detail by FIGS. 7 through 13. The retrofitted sports headgear 10' includes a standard helmet or sports headgear 204 having a helmet or headgear housing 205, and a modular fiber optic retrofit apparatus 202 thereon. Modular fiber-optic retrofit apparatus 202 includes a plastic housing 220 having a first compartment 250 and a second compartment 252 for containing the power source assembly 50' and the fiber optic lighting assembly 80' respectively therein. As shown in FIGS. 7 and 10 to 12, the helmet housing 205 of helmet 204 includes an exterior surface wall 206 and an interior surface wall 208, a front end area 210, side section areas 212 and 214, a rear end area 216 and a top section area 218.

Figure 6:
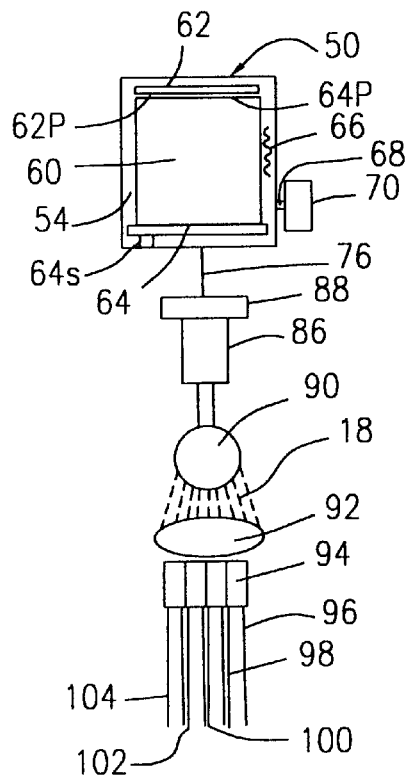
FIG. 6 is a schematic diagram of the sports headgear with fiber optic lighting of the present invention showing the circuitry of the power source assembly and the fiber optic lighting assembly for producing a plurality of visible lighted fiber optic lines on the headgear.
Figure 11:
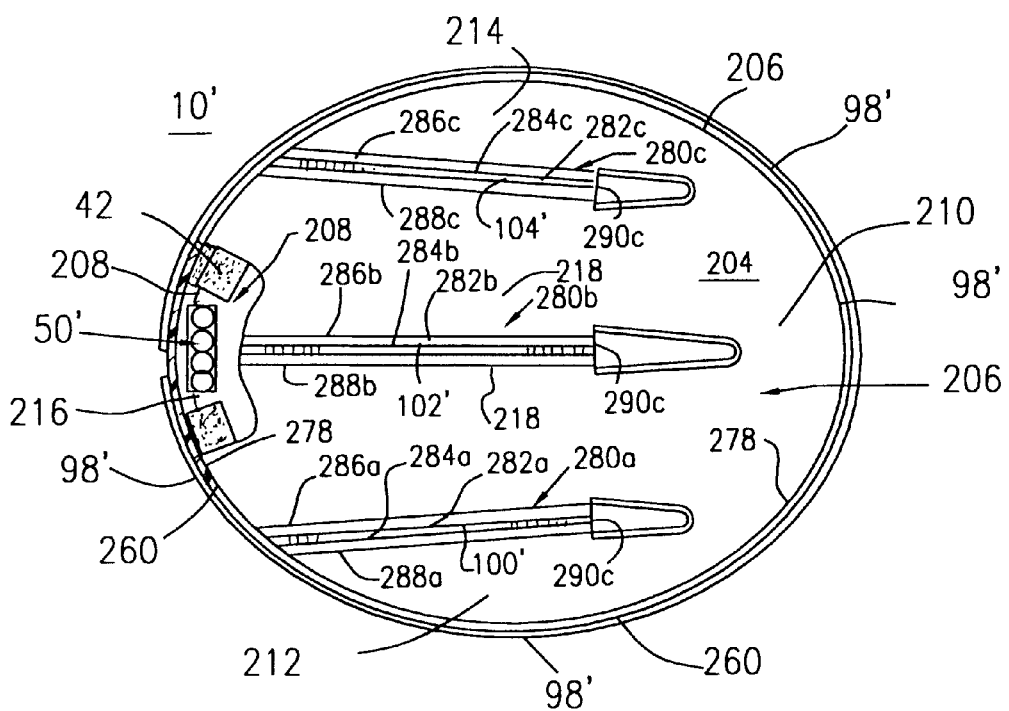
FIG. 11 is a top plan view of the sports headgear with fiber optic lighting of the second embodiment of the present invention showing the modular fiber optic retrofit apparatus and its component parts attached to the exterior and interior surface walls of a standard sports headgear helmet.
Figure 12:
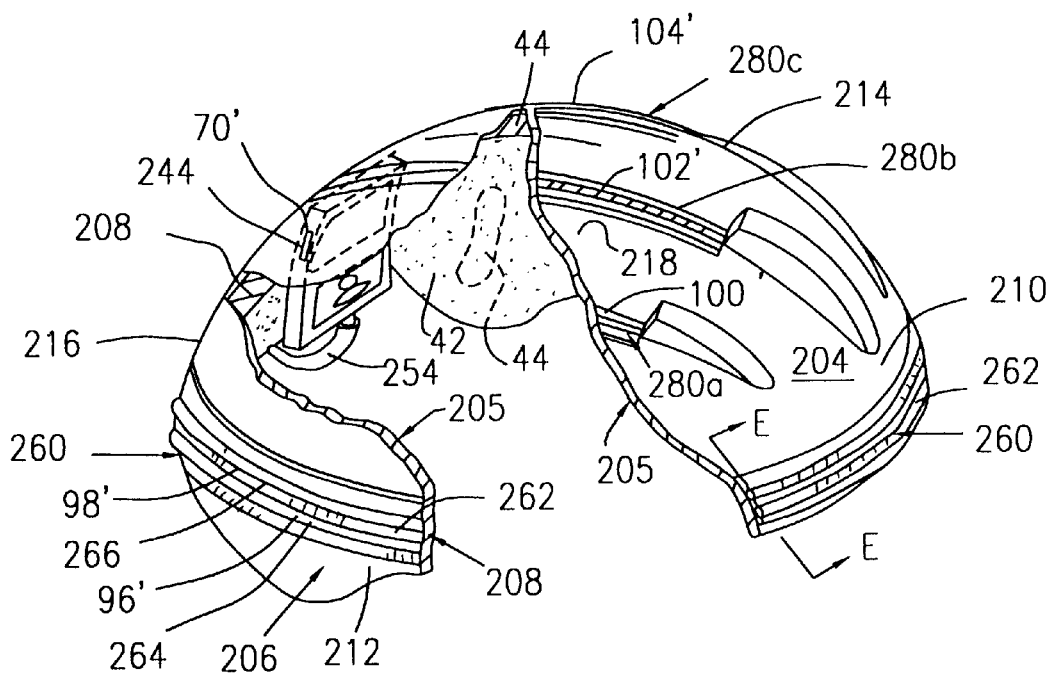
FIG. 12 is a partially cutaway perspective view of the sports headgear with fiber optic lighting of the second embodiment of the present invention showing the location of the electronic housing having the power source and fiber optic lighting assemblies therein; and the attachment and location of the first and second flexible bands on the exterior surface wall of the helmet housing.
Figure 13:
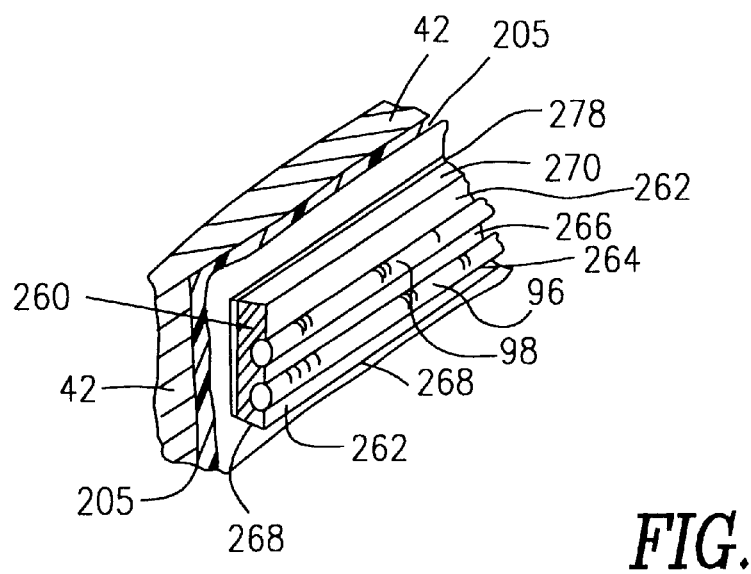
FIG. 13 is an enlarged cross-sectional perspective view of the sports headgear with fiber optic lighting of the second embodiment of the present invention taken along lines E—E of FIG. 12 showing the fiber optic lines being connected to the first flexible band of the modular fiber optic retrofit apparatus and attached to the exterior surface wall of the headgear housing using double-sided tape.

Modular fiber optic retrofit apparatus 202 includes a plastic housing 220 for containment of the power source 50' within the first compartment 250 and for containment of the fiber optic lighting assembly 80' within the second compartment 252. Housing 220 includes a rear wall member 222, side wall members 224 and 226, a top wall member 228, a bottom wall member 230 and a front wall member 232. Front wall member includes slidable doors or snap-cover 234 and 238 for the power source assembly 50' and the fiber optic lighting assembly 80', respectively. Internal compartment 252 also includes a plurality of venting openings 256 being located on the side walls 224 and 226 of housing 220 for the venting of any hot air from within the internal compartment 252 of fiber optic assembly 80', which hot air may be produced by light bulb 90. Rear wall member 222 includes a double-sided adhesive tape strip 238 having a plastic protective film 240 in which to protect the adhesive surface 238s of adhesive tape 238 prior to mounting. The double-sided adhesive tape 238 provides the connecting means in which plastic housing 220 is affixed to the rear end area 216 of the interior surface wall 208, as depicted in FIGS. 11 and 12 of the drawings. Bottom wall member 230 includes a circular hole opening 242 for the plurality of fiber optic lines 96' to 104' extending outwardly out of opening 242. A short section of exposed fiber optic lines 96' to 104' include a flexible sheathing component 254 for protecting the exposed fiber optic lines 96' to 104' from breaking or damage thereof. Side wall 224 includes an opening 244 for receiving of the On/Off button 70' of power source assembly 50'. Housing 220 further includes an interior wall member 246 for the separation of the first compartment 250 from the second compartment 252. Interior wall member 246 includes a circular hole opening 248 for electrical line 76'. Electrical line 76' connects the power source assembly 50' to the fiber optic lighting assembly 80' within plastic housing unit 220. Power source assembly 50'includes the same component parts as in the power source assembly 50 of the preferred embodiment; and fiber optic lighting assembly 80' includes the same component parts as in the fiber optic lighting assembly 80 of the preferred embodiment of the present invention, as depicted in FIGS. 5 and 6 of the drawings.

The modular fiber optic retrofit apparatus 202 further includes a first flexible band 260 for encircling and mounting to the front, side and rear section areas 210, 212, 214, and 216 of the exterior surface wall 206 of headgear housing 205; and a plurality of second flexible bands 280a, 280b, and 280c for mounting to various locations and positions on the top section area 218 of the exterior surface wall 206 of headgear housing 205, as depicted by FIGS. 7, 10, 11 and 12 of the drawings. First and second flexible bands 260 and 280 can be made of moldable foam plastic, rubber or plasticized rubber and equivalents thereof.

Figure 7:
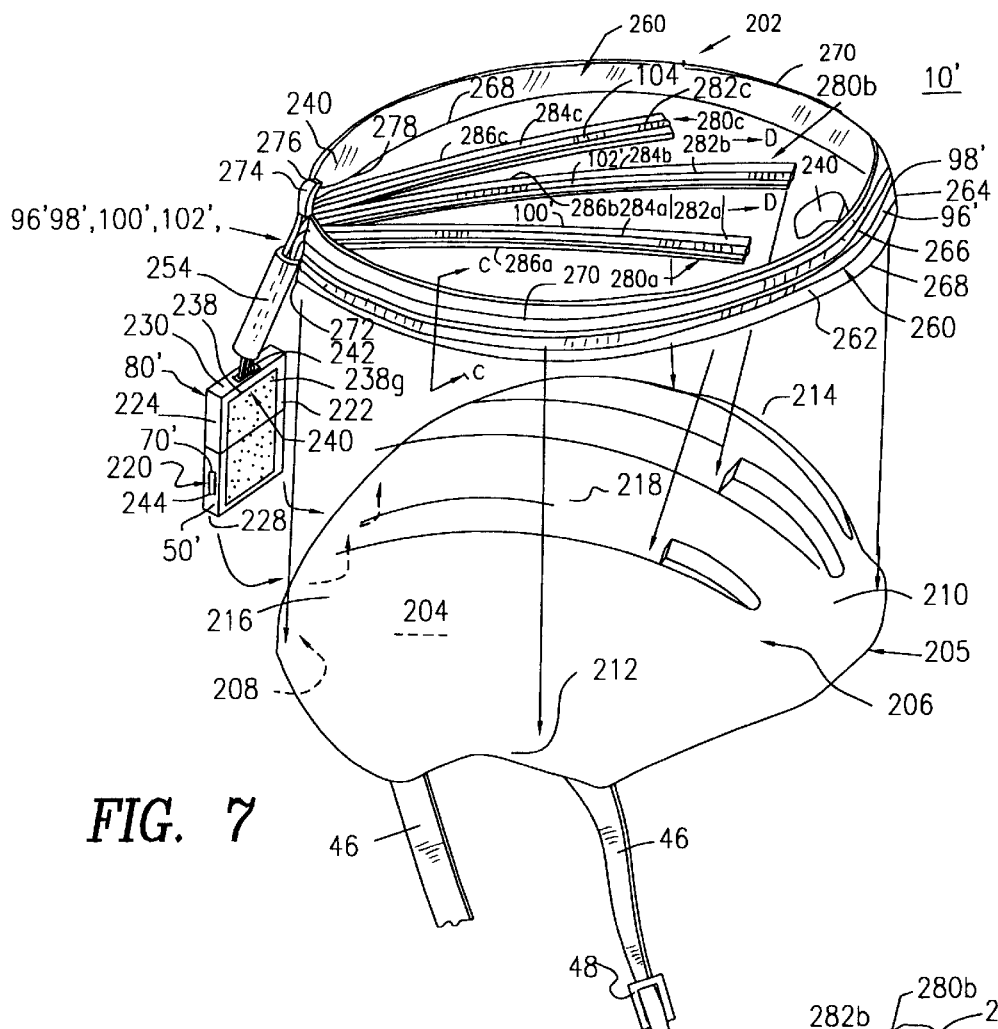
FIG. 7 is a front perspective view of the sports headgear with fiber optic lighting of the second embodiment of the present invention showing a modular fiber optic retrofit apparatus for attaching to the exterior and interior surface walls of a standard sports headgear helmet.
Figure 8:
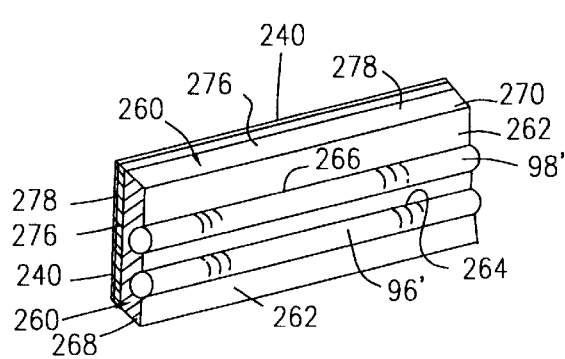
FIG. 8 is an enlarged cross-sectional perspective view of the sports headgear with fiber optic lighting of the second embodiment of the present invention taken along lines C—C of FIG. 7 showing the fiber optic lines connected to one side of the first flexible band, adhesive tape attached to the other side of the first flexible band and a protective plastic film for protecting the adhesive tape prior to attachment of the modular fiber optic retrofit apparatus to the exterior surface wall of the headgear housing.
Figure 10:
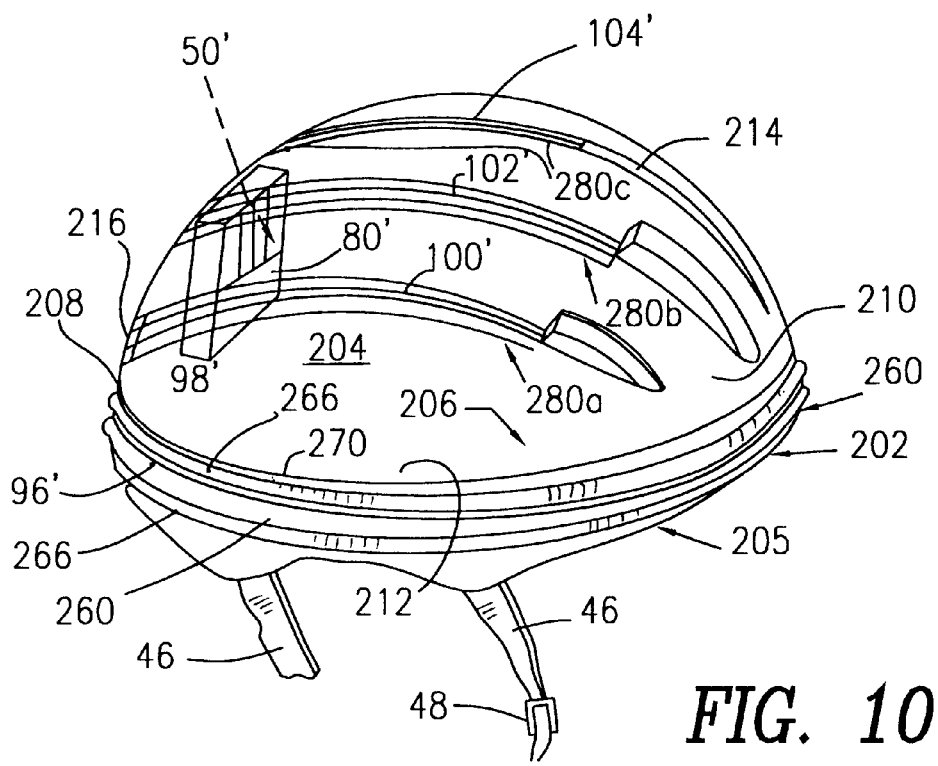
FIG. 10 is a front perspective view of the sports headgear with fiber optic lighting of the second embodiment of the present invention showing the modular fiber optic retrofit apparatus attached to the exterior and interior surface walls of a standard sports headgear helmet.

First flexible band 260, as shown in FIGS. 7, 8, 10, 12, and 13, includes a front surface wall 262 having lower and upper grooves 264 and 266 molded therein, side surface walls 2689, 270, 272, and 274, and a rear surface wall 276 having double-sided adhesive tape 278 thereon. Lower and upper grooves 264 and 266 are used for receiving fiber optic lines 96' and 98' therein. Fiber optic lines 96' and 98' are affixed to grooves 264 and 266 via glue or epoxy cement. Double-sided adhesive tape 278 includes a plastic protective film 240 for protecting the adhesive surface 278s of adhesive tape 278 prior to mounting band 260 to the exterior surface wall 206 of headgear housing 205. The double-sided adhesive tape 278 provides the connecting means in which the first flexible band 260 is attached to the exterior surface wall 206 as previously mentioned, and as depicted in FIGS. 7, 8, and 10 of the drawings.

First flexible band 260 has an overall length in the range of twenty-four inches (24") to thirty-two inches (32"), an overall width in the range of three-fourths of an inch (¾") to one inch (1"), and an overall thickness in the range of one-eighth of an inch (⅛") to one-quarter of an inch (¼"). The actual overall length of first flexible band 260 is dependent upon the circumference of exterior surface wall 206 of headgear housing 204 being adult sizes to children sizes.

Figure 9:
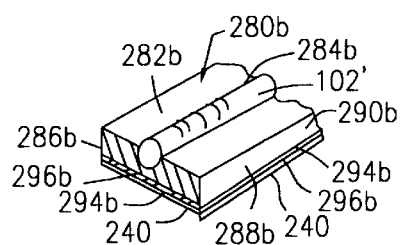
FIG. 9 is an enlarged cross-sectional perspective view of the sports headgear with fiber optic lighting of the second embodiment of the present invention taken along lines D—D of FIG. 7 showing the fiber optic lines connected to one side of the second flexible band, adhesive tape attached to the other side of the second flexible band and a protective plastic film for protecting the adhesive tape prior to attachment of the modular fiber optic retrofit apparatus to the top area of the exterior surface wall of the headgear housing.

The second flexible bands 280a, 280b and 280c, as shown in FIGS. 7, 9, 10, 11 and 12, each (band) include a front surface wall 282a, 282b and 282c having a single groove 284a, 284b and 284c molded therein; side surface walls 286a, 286b, 286c, 288a, 288b, 288c, 290a, 290b, 290c, 292a, 292band 292c; a rear surface wall 294a, 294band 294c having double-sided adhesive tape 296a, 296b and 296c thereon. Grooves 284a, 284b and 284c are used for receiving fiber optic lines 100', 102' and 104' therein. Fiber optic lines 100', 102' and 104' are affixed to grooves 284a, 284b and 284c via glue or epoxy cement. Double-sided adhesive tapes 296a, 296b and 296c include plastic protective films 240a, 240b and 240c for protecting the adhesive surfaces 298a, 298b and 298c of adhesive tapes 296a, 296b and 296c prior to mounting bands 280a, 280b and 280c to the top section area 218 of the exterior surface wall 206 of headgear housing 205. The double-sided adhesive tapes 296a, 296b and 296c provide the connecting means in which the second flexible bands 280a, 280b and 280c are attached to the exterior surface wall 206 as previously mentioned and as depicted in FIGS. 7, 9, and 10 of the drawings.

Second flexible bands have an overall length in the range of eight inches (8") to eighteen inches (18"), an overall width in the range of one-half inch (½") to three-quarters of an inch (¾"), and an overall thickness in the range of one-eight of an inch (⅛") to one-quarter of an inch (¼"). The actual overall length of each second flexible bands 280 are dependent upon the arc lengths of the top section area 218 of exterior surface wall 206 of headgear housing 204 being adult sizes to children sizes.

As shown, the modular fiber optic retrofit apparatus 202 is used for retrofitting and attachment to a standard sports headgear/helmet 204 for illumination of that headgear 204 at great distances which then forms the retrofitted sports headgear 101 of the second embodiment 200. In all other respects, sports headgear 10' of the second embodiment 200 functions and operates in use in the same manner as sports headgear 10 of the preferred embodiment.

THIRD EMBODIMENT 300

Sports headgear 10" of the third embodiment 300 of the present invention is depicted in detail by FIGS. 14 through 16 of the drawings. All aspects of sports headgear 10" of the third embodiment are the same as the sports headgear 10 of the preferred embodiment, except for the addition of the strobe light assembly 302 to the rear end section area 28 of the exterior surface wall 22. Strobe light assembly 302 is used for the further illumination of headgear 10" in which the user's headgear 10" can be visibly seen from the rear at great distances as strobe light assembly 302 is blinking intermittently. Strobe light assembly 302 includes a housing 304 having a rear wall member 306 with a circular hole opening 308 for electrical line 330, a cylindrical wall member 310 and a front wall member 312 with a circular hole opening 314 for receiving a clear or colorized snap-in circular plastic lens 316. Rear wall member 306 further includes an inner surface wall 318 and an outer surface wall 320. Outer surface wall 320 of rear wall member 306 is connected to the rear section area 28 of the exterior surface wall 22 of helmet housing 20 via glue, epoxy cement or double-sided adhesive tape 322. Strobe light assembly 302 also includes a socket component 324 having an electronic strobing light device 326, a light bulb 328, and an electrical line 330 being connected to both the electronic strobing light device 326 and the power source assembly 50 via a second circular hole opening 31 located on the rear section area 28 of the exterior surface wall 22 of helmet housing 20. Electronic strobing device 326 is centrally located and connected to the inner surface wall 318 of rear wall member 306, as shown in FIGS. 15 and 16 of the drawings. Circular hole opening 31 on rear section area 28 is aligned with the circular hole opening 308 on rear wall member 306 such that electrical line 330 is easily connected to the electronic strobing device 326 within strobe housing 304 and power source assembly 50. In all other respects, headgear 10" of the third embodiment 300 functions and operates in use in the same manner as headgear 10 of the preferred embodiment.

FOURTH EMBODIMENT 400

Sports headgear 10'" of the fourth embodiment 400 of the present invention is depicted in detail by FIGS. 17 to 19 of the drawings. All aspects of sports headgear 10'" of the fourth embodiment are the same as the sports headgear 10' of the second embodiment 200, except for the addition of the strobe light assembly 402 being connected to the modular fiber optic retrofit apparatus 202. Strobe light assembly 402 (when affixed to the rear end section area 216 of the exterior surface wall 206) is used for the further illumination of headgear 10'" in which the user's headgear 10'" can be visibly seen from the rear at great distances as strobe light assembly 402 is blinking intermittently. Strobe light assembly 402 includes a housing 404 having a top wall member 406, side wall members 408 and 410, a bottom wall member 412 with a circular hole opening 414 for electrical line 436, a front wall member 416 with a square hole opening 418 for receiving of a clear or colorized snap-in square plastic lens 420, and a rear wall member 422.

Rear wall member 422 further includes an inner surface wall 424 and an outer surface wall 426. Outer surface wall 426 of rear wall member 422 includes a double-sided adhesive tape strip 428 thereon having a plastic protective film 440 on tape strip 428 in which to protect the adhesive surface 428s of adhesive tape strip 428 prior to mounting the strobe light assembly 402 to exterior surface wall 206. The double-sided adhesive tape 428 provides the connecting means in which the strobe housing 404 is attached to the rear end section area 216 of the exterior surface wall 206 of helmet housing 205, as depicted in FIG. 18 of the drawings. Strobe light assembly 402 further includes a socket component 430 having an electronic strobing light device 432, a light bulb 434 and an electrical line 436 being connected to both the electronic strobing device 432 an the power source assembly 50' via a circular hole opening 242 centrally located on bottom wall 230 of plastic housing 220. Electronic strobing device 432 is centrally located and connected to the inner surface wall 424 of rear wall member 422, as shown in FIGS. 17 to 19 of the drawings. In all other respects, sports headgear 10'" of the fourth embodiment 400 functions and operates in use in the same manner as sports headgear 10' of the second embodiment 200.

OPERATION OF THE PRESENT INVENTIONS

In operating the preferred embodiment 10 and third embodiment 300 of sports headgear helmets 10 and 10", respectively, the user simply switches/pushes the ON mode at the first position 70a of ON/OFF switch/button 70 of the power source assembly 50 located on battery pack housing 52 to power-up the fiber optic lines 96 to 104 and light bulb 434 of strobe light assembly 402 for providing a steady stream of light rays 18 for illumination of the sports headgear helmets 10 and 10". If the user wants a strobing light effect to the fiber optic lines 96 to 104 and light bulb 434 of strobe light assembly 402, the user then switches/pushes the ON mode at the second position 70b of ON/OFF switch/button 70 of the power source assembly 50 located on battery pack housing 52 for providing a pulsating stream of light rays 18P for illumination of the fiber optic lines 96 to 104 and the light bulb 434 of strobe light assembly 402 of sports headgear helmets 10 and 10", respectively, as shown in FIGS. 2, 5, 14 and 16.

The user then puts on the sports headgear 10 or 10" on his/or her head 12, secures and positions the headgear 10 or 10" properly on the user's forehead area 14 and the back of user's head area 16 by the use of the tightening device 48 of closure strap component 46. The sports headgear 10 or 10" is now in operational use, such that the high intensity fiber optic lighting and strobe lighting gives the user's headgear 10 or 10" illumination for other sport participants, pedestrians, and motorists to view and see the illuminated headgear 10 or 10" at dusk, evening or nighttime hours being visible at great distances.

In operating the second embodiment 200 and fourth embodiment 400 using the modular fiber optic retrofit apparatus 202 and 402, respectively, the user simply places the aforementioned apparatus 202 and 402 on a standard sports headgear helmet 204, as shown in FIGS. 7 and 17 of the drawings. Retrofit apparatus 202 and 402 are positioned and placed on helmet 204 such that the first flexible band 260 having the double-sided tape 278 facing inwardly (plastic film 240 has been previously removed) from tape 278 for adhering purposes is circumjacently affixed along the rear, side, and front section areas 216, 214, 212 and 210, respectively, of exterior surface all 202 of headgear housing 205, as shown in FIGS. 7, 11 and 17 of the drawings. The user then places the second flexible bands 280a to 280c having the double-sided adhesive tape 296a to 296c facing downwardly (plastic protective films 240 have been previously removed from tapes 296a to 296c for adhering purposes) where the tapes are then affixed at predetermined locations on the top section area 218 of exterior surface wall 206 of headgear housing 205, as shown in FIGS. 7, 11, and 17.

Next, the user positions and places the plastic housing 220 having the power source and the fiber optic lighting assemblies 50' and 80' respectively therein, such that the double-sided adhesive tape strip 238 of rear wall member 222 (plastic protective film 240 has been previously removed from tape surface 238S for adhering purposes) is affixed to the rear end area 216 of the interior surface wall 208 of helmet housing 205, as shown in FIGS. 11, 12 and 18 of the drawings.

Additionally, in using the embodiment 400, the user then positions and places the strobe light assembly 402 having the double-sided adhesive tape 428 on outer surface wall 426 of rear wall member 422 facing inwardly (again plastic protective film patch 240 has been previously removed from tape surface 428S for adhering purposes) where the adhesive tape 428 is then affixed to the rear end section area 216 of the exterior surface wall 206 of helmet housing 205. Strobe light assembly 402 is centrally located on the rear area 216, as shown in FIGS. 17 and 18 of the drawings.

The aforementioned attachments of the first and second flexible bands 260, and 280a to 280c; the plastic housing 220 for electronics; and the strobe light assembly 402 of the modular fiber optic retrofit apparatus 202 and 402, respectively, to the sports headgear housing 205 in the manner described provides the retrofitted sport headgear 10' and 10''' with fiber optic lighting 80'. In all other respects, the sports headgear 10' and 10''' with fiber optic lighting 80', as shown in FIGS. 7 to 13, and 17 to 19 of the second and fourth embodiments 200 and 400, functions and operates in the same manner as the sports headgear 10 and 10'' with fiber optic lighting 80, as shown in FIGS. 1 to 7 and 14 to 16 of the preferred and third embodiments 10 and 300 of the present invention.

ADVANTAGES OF THE PRESENT INVENTION

Accordingly, an advantage of the present invention is that it provides for a light-weight, durable, sports headgear having a fiber optic lighting assembly which provides safety and aesthetic lighting qualities to headgear for athletes participating in a given sporting activity, to be worn by adults and children of both sexes.

Another advantage of the present invention is that it provides for a sports headgear having fiber optic lighting for athletes participating in such sporting activities as skate boarding, biking, in-line roller blading, ice skating, roller skating, running, jogging, skiing, snow-boarding, sky-diving, and the like.

Another advantage of the present invention is that it provides for a sports headgear having fiber optic lighting of high intensity which gives the user's headgear sufficient illumination for other sport participants, pedestrians, and motorists to view and see the illuminated headgear when in operational use and being visible at long distances.

Another advantage of the present invention is that it provides for sports headgear having a fiber optic lighting assembly that is durable in use, low in maintenance, and long-lasting for increased lighting and service life of the fiber optic lighting assembly when in operational use.

A further advantage of the present invention is that it provides for a sports headgear having fiber optic lighting that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Headgear having fiber optic lighting for illumination of said headgear to be worn on the head of a person, comprising:

a) said headgear having an exterior surface wall and an interior surface wall;

b) a fiber optic lighting assembly including a light source and a plurality of fiber optic lines for transmitting light from said light source;

c) said exterior surface wall having one or more grooves formed therein for holding said fiber optic lines therein;

d) power source means for supplying power to said fiber optic lighting assembly; said fiber optic lighting assembly including a housing having a first compartment for receiving said power source means and a second compartment for receiving said light source;

e) attachment means for attaching said first and second compartments to said interior surface wall of said headgear; said attachment means being selected from the group consisting of double-sided tape, glue and epoxy cement;

f) connector means for connecting said power source means to said light source;

g) interior padding covering said interior surface wall for protecting the head of the wearer from injury; and h) closure means mounted on said headgear for holding said headgear on the head of the wearer.

2. Headgear with fiber optic lighting in accordance with claim 1, wherein said light source further includes a bulb socket having a light strobing component therein; a high intensity light bulb for producing light rays; and a lens component for focusing the light rays into said plurality of fiber optic lines forming a fiber optic bundle.

3. Headgear with fiber optic lighting in accordance with claim 2, wherein said light strobing component of said light source is used for the intermittent blinking of said plurality of fiber optic lines.

4. Headgear with fiber optic lighting in accordance with claim 1, wherein said power source means includes one or more batteries; positive and negative plate members; a connector post having an electrical line for transferring of electrical power; and switch means for turning on or off the electrical power.

5. Headgear with fiber optic lighting in accordance with claim 4, wherein said switch means are selected from the group consisting of a switch, a button, a toggle and a rotable knob.

6. Headgear with fiber optic lighting in accordance with claim 5, wherein said switch means further includes a first position ON mode for providing a steady stream of light rays from said plurality of fiber optic lines; a second position ON mode for providing a pulsating stream of light rays from said plurality of fiber optic lines; and a third position OFF mode for deactivating said power source means.

7. Headgear with fiber optic lighting in accordance with claim 1, wherein said first and second compartments include a cover for protecting said power source means and said fiber optic lighting assembly.

8. Headgear with fiber optic lighting in accordance with claim 2, wherein said means for connecting said power source means to said light source includes an electrical line connected at one end to said connector post and at the other end to said bulb socket.

9. Headgear with fiber optic lighting in accordance with claim 1, further including a strobe light assembly for further illumination of light to said headgear.

10. Headgear with fiber optic lighting in accordance with claim 9, wherein said strobe light assembly is attached to said exterior surface wall of said headgear.

11. Headgear with fiber optic lighting in accordance with claim 9, wherein said strobe light assembly further includes a strobe housing having a removable lens; a high intensity strobe light bulb for producing light rays; a bulb socket having a light strobing component therein for pulsing the light rays from said high intensity strobe light bulb; an electrical line for connection to said power source means and strobe switch means for turning on and off the electrical power for said strobe light assembly.

12. Headgear with fiber optic lighting in accordance with claim 11, wherein said light strobing component of said strobe light assembly is used for the intermittent blinking of said high intensity strobe light bulb.

13. Headgear with fiber optic lighting in accordance with claim 11, wherein said strobe switch means further includes a first position ON mode for providing a steady stream of light rays from said high intensity strobe light bulb and from said plurality of fiber optic lines; a second position ON mode for providing a pulsating stream of light rays from said high intensity strobe light bulb and from said plurality of fiber optic lines; and a third position OFF mode for deactivating said power source means.

14. Headgear with fiber optic lighting in accordance with claim 1, wherein said housing is made of material selected from the group consisting of formable plastic and metal.

15. Headgear having a modular fiber-optic retrofit apparatus for illumination of said headgear to be worn on the head of a person, comprising:
   a) said headgear having an exterior surface wall and an interior surface wall;
   b) a fiber optic lighting assembly including a light source and first and second sets of one or more fiber optic lines for transmitting light from said light source;
   c) a first flexible band having a front surface wall and a rear surface wall for encircling said exterior surface wall and for mounting and holding said first set of one or more fiber optic lines thereon; and one or more second flexible bands each having a top surface wall and a bottom surface wall each for mounting and holding said second set of one or more fiber optic lines thereon; said rear surface wall includes a strip of double-sided adhesive tape thereon; and said one or more bottom surface walls each include a strip of double-sided adhesive tape thereon;
   d) first attachment means for attaching said first flexible band and said second flexible bands to said exterior surface wall of said headgear; said first attachment means for attaching includes said double-sided adhesive tape of said first and second flexible bands for attaching to said exterior surface wall of said headgear;
   e) power source means for supplying power to said fiber optic lighting assembly; said fiber optic lighting assembly including a housing having a first compartment for receiving said power source means and a second compartment for receiving said light source;
   f) second attachment means in the form of double-sided tape for attaching said first and second compartments to said interior surface wall of said headgear; and
   g) connector means for connecting said power source means to said light source.

16. Headgear with fiber optic lighting in accordance with claim 15, wherein said light source further includes a bulb socket having a light strobing component therein for pulsing light rays; a high intensity light bulb for producing light rays; and a lens component for focusing the light rays into said plurality of fiber optic lines forming a fiber optic bundle.

17. Headgear with fiber optic lighting in accordance with claim 16, wherein said light strobing component of said light source is used for the intermittent blinking of said plurality of fiber optic lines.

18. Headgear with fiber optic lighting in accordance with claim 15, wherein said power source means include one or more batteries; positive and negative plate members; a connector post having an electrical line for transferring of electrical power; and switch means for turning on or off the electrical power.

19. Headgear with fiber optic lighting in accordance with claim 18, wherein said switch means are selected from the group consisting of a switch, a button, a toggle and a rotable knob.

20. Headgear with fiber optic lighting in accordance with claim 19, wherein said switch means further includes a first position ON mode for providing a steady stream of light rays from said plurality of fiber optic lines; a second position ON mode for providing a pulsating stream of light rays from said plurality of fiber optic lines; and a third position OFF mode for deactivating said power source means.

21. Headgear with fiber optic lighting in accordance with claim 15, wherein said front surface wall has one or more grooves formed therein for holding said fiber optic lines therein; and said one or more top surface walls each has one or more grooves formed therein for holding said one or more fiber optic lines therein.

22. Headgear with fiber optic lighting in accordance with claim 15, wherein said first and second compartments include a cover for protecting said power source means and said fiber optic lighting assembly.

23. Headgear with fiber optic lighting in accordance with claim 16, wherein said means for connecting said power source means to said light source includes an electrical line connected at one end to said connector post and at the other end to said bulb socket.

24. Headgear with fiber optic lighting in accordance with claim 15, further including a strobe light assembly for further illumination of light to said headgear.

25. Headgear with fiber optic lighting in accordance with claim 24, wherein said strobe light assembly is attached to said exterior surface wall of said headgear.

26. Headgear with fiber optic lighting in accordance with claim 24, wherein said strobe light assembly further includes a strobe housing having a removable lens; a high intensity strobe light bulb for producing light rays; a bulb socket having a light strobing component therein for pulsing the light rays from said high intensity strobe light bulb; an electrical line for connection to said power source means; and strobe switch means for turning on and off the electrical power for said strobe light assembly.

27. Headgear with fiber optic lighting in accordance with claim 26, wherein said light strobing component of said strobe light assembly is used for the intermittent blinking of said high intensity strobe light bulb.

28. Headgear with fiber optic lighting in accordance with claim 26, wherein said strobe switch means further includes a first position ON mode for providing a steady stream of light rays from said high intensity strobe light bulb and from said plurality of fiber optic lines; a second position ON mode for providing a pulsating stream of light rays from said high intensity strobe light bulb and from said plurality of fiber optic liens; and a third position OFF mode for deactivating said power source means.

29. Headgear with fiber optic lighting in accordance with claim 15, wherein said housing is made of a material selected from the group consisting of formable plastic and metal.

30. Headgear with fiber optic lighting in accordance with claim 15, wherein said first and second flexible bands are made from materials selected from the group consisting of flexible plastic, foam, plasticized rubber and rubber.

* * * * *